United States Patent [19]

Charnock et al.

[11] Patent Number: 5,811,485
[45] Date of Patent: Sep. 22, 1998

[54] TWO-PACK ADHESIVE COMPOSITION

[75] Inventors: Ronald Scott Charnock, Blunham; Derrick Frederick Deamer, Stevenage; James Duncan Holloway, Tring, all of United Kingdom

[73] Assignee: Polycell Products Ltd., Welwyn Garden City, United Kingdom

[21] Appl. No.: 897,393

[22] Filed: Jul. 21, 1997

Related U.S. Application Data

[63] Continuation of Ser. No. 548,484, Oct. 26, 1995, abandoned.

[30] Foreign Application Priority Data

Oct. 26, 1994 [GB] United Kingdom .................... 9421609

[51] Int. Cl.$^6$ ................................. C08L 31/04; C08J 3/00
[52] U.S. Cl. .......................... 524/563; 524/564; 524/906; 523/337; 525/935
[58] Field of Search ....................... 524/563, 564, 524/906; 525/939; 523/337

[56] References Cited

U.S. PATENT DOCUMENTS

| | | | |
|---|---|---|---|
| 4,355,073 | 10/1982 | Knightley | 428/350 |
| 4,663,377 | 5/1987 | Hombach et al. | 524/563 |
| 5,349,009 | 9/1994 | Furlan | 524/563 |

FOREIGN PATENT DOCUMENTS

| | | |
|---|---|---|
| 0 041 842 A1 | 12/1981 | European Pat. Off. . |
| 1 594 541 | 7/1981 | Germany . |
| 2 077 750 | 12/1981 | United Kingdom . |
| 2 129 818 | 5/1984 | United Kingdom . |

*Primary Examiner*—Tae Yoon
*Attorney, Agent, or Firm*—Fish & Richardson P.C.

[57] ABSTRACT

The present invention relates to an adhesive kit comprising two packs and a method of manufacture of an adhesive composition therefrom. The kit comprises, in a first pack a water-continuous polymer emulsion and in a second pack a non-alkali activated inverse emulsion of a high molecular weight water soluble synthetic polymer. The method of manufacture of the adhesive requires mixing for short periods with hand stirring. The adhesive composition formed is particularly, but not exclusively useful as an adhesive for hanging wallpaper.

6 Claims, No Drawings

TWO-PACK ADHESIVE COMPOSITION

This is a continuation of application Ser. No. 08/548,484 filed on Oct. 26, 1995 by Ronald S. Charnock, Derrick F. Deamer, and James D. Holloway, now abandoned.

The present invention relates to an adhesive kit comprising two packs and a method of manufacture of an adhesive composition therefrom. The kit comprises, in a first pack a water-continuous polymer emulsion and in a second pack an inverse emulsion of a high molecular weight water soluble synthetic polymer. The method of manufacture of the adhesive requires mixing for short periods with hand stirring. The single adhesive composition formed from the two packs is particularly, but not exclusively, useful as an adhesive for hanging wallcoverings.

Known adhesives for hanging wallcoverings have been mainly based on solid compositions of flake starch ether or powdered methyl cellulose. These products are sold in dried solid form as an all-purpose product which requires mixing with water before use. These solid products are associated with difficulties in preparation of the adhesive often resulting in lumps of undissolved powder. It is also necessary to stand the prepared paste for some time in order to effect complete dissolution of the flake or powder composition and for the full adhesive properties of the paste to develop.

Other proposed adhesive compositions involve the use of inverse acrylic emulsions. Examples of such liquid based adhesives are described in EP-A-0008213 and GB-A-2077750. A further adhesive composition is described in GB-A-2027718 as an aqueous copolymer emulsion including at least one ethylenically unsaturated acid together with a thickener comprising an alkali metal, ammonium compound or organic amine. Such liquid based adhesive compositions have been proposed as suitable bases for wallpaper adhesives although in practice their adhesion performance is often insufficient due to poor electrolyte resistance of the components. Electrolyte resistance is a critical factor involved in adhesion performance of the emulsions, and is defined as resistance of the adhesive to viscosity and adhesion loss in the presence of common inorganic salts such as calcium sulphate (plaster).

A base for an adhesive composition which obviates the need to mix solid powder with water but which results in an adhesive composition which possesses adhesion properties to match conventional products and meets the current British Standard for wallcovering adhesives BS3046 1981 (1991) is therefore a desideratum.

The present invention provides a two-pack adhesive kit comprising, in a first pack a water-continuous polymer emulsion, and in a second pack, an inverse emulsion of a high molecular weight water soluble synthetic polymer. The inverse emulsion does not require the addition of alkali in order to produce a thickening effect (i.e. it is non-alkali activated). The kit provides two liquid components which when combined together form a single adhesive composition. The water-continuous polymer emulsion (the first pack) provides adhesive properties to the composition. The inverse emulsion (the second pack) provides the thickener and modifies the rheology of the single adhesive composition. The two components of the composition have convenient mixing properties which when mixed together rapidly for just seconds give a smooth adhesive paste within minutes and which produce a paste with adhesive performance at least equal to currently available systems.

Preferably the kit composition is provided in concentrate form such that before use the contents of either the first pack, the second pack, both packs or the combined packs are added to water. Providing the liquid components of the two packs in concentrate form reduces the required storage and transport volumes of the two-pack composition. Preferably when the two emulsions are mixed together with water the single adhesive composition comprises in the range of from 1–20% of the water-continuous emulsion, in the range of from 1–20% of the inverse emulsion and the balance of water. The variable selection of liquid component percentages ensures good viscosity development of the single adhesive composition. Furthermore, easy adjustment of the viscosity of the single adhesive composition is possible by the addition of further liquid concentrate (either water-continuous emulsion or inverse emulsion) which has not previously been possible with known powdered or liquid products.

A suitable water-continuous polymer emulsion is a surfactant or colloid stabilized vinyl acetate copolymer or homopolymer such as a copolymer of vinyl acetate and butyl acrylate. Alternative water-continuous polymer emulsions of the present invention comprise terpolymers of vinyl acetate, the vinyl ester of a long chain branched organic acid and acrylic ester. Advantageously the polymers have a viscosity in the range of from 10 to 3000 mPaS.

The inverse emulsion is non-alkali activated and preferably comprises a high molecular weight soluble synthetic polymer finely dispersed in a high purity organic medium. Examples of inverse emulsions according to the present invention include an aqueous solution of a copolymer of ethylenically unsaturated monomers dispersed in isoparaffin hydrocarbon or an acrylamide copolymer dispersion in a solvent refined mineral oil. The inverse emulsions may be those as described in EP-A-0008213 or GB-A-2077750

The kit may also comprise one or more components selected from biocides, plasticisers, starch, celluloses or surfactants. These additional components are preferably present in the water-continuous polymer emulsion pack. A suitable plasticiser according to the present invention is di-iso butyl phthalate (CAS No. 84-69-5, available from B.A.S.F. Plc., BP Chemicals Ltd. or Ciba Geigy Industrial Chemicals).

The single adhesive composition formed from the kit is suitable as an adhesive for all weights of wallpaper. It possesses high adhesion qualities to all common building surfaces. The single adhesive composition is of low toxicity and is safe to handle.

The single adhesive composition formed is particularly suitable as an adhesive for hanging wallcoverings. It is also particularly suitable as a paper or paperboard adhesive and can be used as an adhesive on other surfaces.

The present invention also provides a method of making a single adhesive composition comprising mixing, by hand, a water-continuous polymer emulsion and a non-alkali activated inverse emulsion of a high molecular weight water soluble synthetic polymer until a thick paste is formed. The surprising advantage of such a method involving the specified reagents is that it is practically impossible that lumps are formed which cannot be dispersed or broken down by hand stirring. This is in contrast to prior art methods which require high speed mechanical stirring in order to produce a uniform paste. Accordingly, the present invention allows for the provision of individual packs of liquid reagents to non-skilled users to prepare an adhesive composition for domestic use. The individual packs need simply to be mixed together (with water as necessary) in a single container until a smooth paste is achieved. At a slow stirring speed this may take several minutes (up to 15). A preferred mixing procedure is to stir the reagents at a speed of up to 2 stirs per second for up to 2 minutes, leave for up to 2 minutes and then repeat the stirring for up to 2 minutes. The "rest" time between the stirring allows time for the polymer to swell. Viscosity increases further as the polymer swells. A stirring speed of 2 stirs per second is fairly vigorous and allows for a smooth paste to be achieved in as little as 2 minutes. It is not necessary to stir at this speed but the slower the speed the longer time will be required to achieve a smooth paste (thus a stirring rate of 1 stir per second will require approximately twice as long as a stirring rate of 2 stirs per second to achieve the same level of smoothness in the paste). The preferred stirring implement is a palette knife (for example of 32 mm by 205 mm) although any tool, knife or implement may be used. The single adhesive composition preferably comprises 1–20% of the water continuous polymer emulsion, 1–20% of the inverse polymer with the balance of water and optionally other components as listed above.

Where the kit is provided in concentrated form and requires the addition of water to form the final adhesive composition the two packs and the water can be mixed in any order. A brief description of the reaction of the reagents according to the present invention is as follows: The two reagents are, as described above, preferably added to water while being stirred. At this time the mixture is a low viscosity opaque white liquid. As the mixture is stirred the inverse emulsion inverts. The inverted polymer swells in the water and the mixture appears with a consistency of a globular suspension (similar to rice pudding). The viscosity starts to rise. The paste, when left for 2–3 minutes increases further in viscosity as the polymer swells to its complete capacity. Further stirring of the paste introduces a shear which breaks down to swollen particles and forms a high viscosity smooth paste. This description is particularly applicable to the invention as described in the accompanying examples. It is to be noted that all stirring may be carried out by hand. The present invention is not limited to the stirring being carried out by hand, but simply to a rate of stirring which can be achieved without mechanical assistance.

A significant feature according to the present invention is that it is practically impossible to produce lumps when mixing the reagents which cannot be broken down by hand stirring. If the recommended mixing procedure is not followed all that happens is that the thickening time is extended but the system is always recoverable to a smooth paste by hand stirring.

The preferred method of making the single adhesive composition however comprises adding the water-continuous polymer emulsion and the inverse polymer simultaneously to water while stirring. In the alternative where concentrated packs of water-continuous polymer emulsion and inverse polymer are used the water-continuous emulsion may be added to water prior to the addition of the inverse emulsion. This avoids mixing water with an already thickened paste of the combined water-continuous polymer emulsion and the inverse emulsion.

During preparation of the adhesive composition the paste quickly thickens without any risk of lump formation. The viscosity of the paste can be reduced by inclusion of additional water or additional water-continuous polymer emulsion or increased by the inclusion of additional inverse emulsion.

The present invention further provides an adhesive composition comprising a water-continuous polymer emulsion and an inverse emulsion of a high molecular weight water soluble synthetic polymer. Preferably the adhesive composition comprises in the range of from 1–20% of the water-continuous polymer emulsion, in the range of from 1–20% of the inverse emulsion and the balance of water and optionally one or more components selected from biocides, plasticisers, starch, celluloses or surfactants.

Water-continuous emulsions of the adhesive composition include vinyl acetate copolymers or homopolymers such as a copolymer of vinyl acetate and butyl acrylate. Alternative water-continuous polymer emulsions of the present invention comprise terpolymers of vinyl acetate, the vinyl ester of a long chain branched organic acid and acrylic ester. Preferably the polymers have a viscosity in the range of from 10 to 3000 mPaS. Suitable inverse emulsions of the adhesive composition include a high molecular weight water soluble synthetic polymer finely dispersed in a high purity organic medium and an aqueous solution of a copolymer of ethylenically unsaturated monomers dispersed in isoparaffin hydrocarbon or an acrylamide copolymer dispersion in a solvent refined mineral oil. A suitable plasticiser includes di-iso butyl phthalate.

The present invention will now be described by the following Examples:

EXAMPLE 1

A kit comprised the following:

Pack [1]—EMULTEX VV531: a terpolymer of vinyl acetate, VeoVA 10, Butyl Acrylate (available from Harlow Chemical Company Limited (HARCO)).

Solids Content—52.5%

Viscosity—600 mPaS pH—6.5

Particle Size—0.17 Microns

Minimum Film Forming Temperature—4° C.

Specific Gravity—1.05

Stabilisation—Surfactant

Pack [2]—TEXIPOL 63-503: an aqueous solution of a copolymer of ethylenically unsaturated monomers dispersed in Isoparaffinic hydrocarbon (available from Scott Bader Company Ltd).

Isoparaffin content—22.5% w/w

Viscosity—3000 mPaS

Specific Gravity—1.05

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive Composition

Viscosity—31200 mPaS pH 6.5

Solids content—4.2%

The prepared adhesive was used to hang a vinyl coated wallpaper onto an emulsion painted plaster wall. The adhesive was found to be easy to brush out, and had good wet tack and slip properties. After a drying period of 10 days on the wall, the adhesion was found to be sufficient to cause delamination of the wallcovering.

The adhesive was further tested by hanging lightweight and embossed wallpapers, and in all cases the adhesion was found to be sufficient to cause delamination of these wallcoverings.

EXAMPLE 2

A kit comprised the following:

Pack [1]—EMULTEX VV568: a terpolymer of vinyl acetate, VeoVA 10, Butyl Acrylate (available from Harlow Chemical Company Ltd).

Solids Content—52.5%

Viscosity—2750 mPaS pH—5.5

Particle Size—0.20 Microns

Minimum Film Forming Temperature—3° C.

Specific Gravity—1.05

Pack [2]—TEXIPOL 63-503: an aqueous solution of a copolymer of ethylenically unsaturated monomers dispersed in Isoparaffinic hydrocarbon (available from Scott Bader Company Ltd).

Isoparaffin content—22.5% w/w

Viscosity—3000 mPaS

Specific Gravity—1.05

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive Composition

Viscosity—20800 mPaS pH—7.0

Solids content—4.2%

EXAMPLE 3

A kit comprised the following:

Pack [1]—MOWILITH DV: a vinyl acetate homopolymer (available from Harlow Chemical Company Ltd or Hoechst)

Solids Content—50.0%

Viscosity—75 mPaS pH—4.5

Minimum Film Forming Temperature—16° C.

Specific Gravity—1.09

Pack [2]—TEXIPOL 63-503: an aqueous solution of a copolymer of ethylenically unsaturated monomers dispersed in Isoparaffinic hydrocarbon (available from Scott Bader Company Ltd).

Isoparaffin content—22.5% w/w

Viscosity—3000 mPaS

Specific Gravity—1.05

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive Composition

Viscosity—16000 mPaS pH—6.5

Solids content—4.1%

EXAMPLE 4

A kit comprised the following:

Pack [1]—MOWILITH DP 4026: a vinyl acetate homopolymer (available from Harlow Chemical Company Ltd or Hoechst)

Solids Content—50.0%

Viscosity—1500 mPaS pH—4.0

Minimum Film Forming Temperature—5° C.

Particle Size—0.3 microns

Specific Gravity—1.09

Stabilisation—Colloidal

Pack [2]—TEXIPOL 63-503: an aqueous solution of a copolymer of ethylenically unsaturated monomers dispersed in Isoparaffinic hydrocarbon (available from Scott Bader Company Limited).

Isoparaffin content—22.5% w/w

Viscosity—3000 mPaS

Specific Gravity—1.05

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive Composition

Viscosity—19000 mPaS pH—7.0

Solids content—4.1%

EXAMPLE 5

A kit comprised the following:

Pack [1]—MOWILITH DV: a vinyl acetate homopolymer (available from Harlow Chemical Company Ltd or Hoechst).

Solids Content—50.0%

Viscosity—75 mPaS pH—4.5

Minimum Film Forming Temperature—16° C.

Specific Gravity—1.09

Pack [2]—COLLAFIX 404: an acrylamide copolymer dispersion in a solvent refined mineral oil (available from Allied Colloids).

Solids Content—50%

Viscosity—1440 mPaS

Specific Gravity—1.1

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive Composition

Viscosity—4080 mPaS

H—6.5

Solids content—4.1%

EXAMPLE 6

A kit comprised the following:

Pack [1]—EMULTEX VV568: a terpolymer of Vinyl acetate, VeoVA 10 and Butyl acrylate (available from Harlow Chemical Company Ltd).

Solids Content—52.5% pH—5.5

Viscosity—2750 mPaS

Particle Size—0.2 Microns

Pack [2]—COLLAFIX 404: an acrylamide copolymer dispersion in a solvent refined mineral oil (available from Allied Colloids).

Solids Content—50%

Viscosity—1440 mPaS

Specific Gravity—1.1

Polymer Charge—Anionic

A paste was prepared by adding 50 g of Pack [1], and 50 g of Pack [2], simultaneously to 900 g tap water whilst stirring at a hand stirring rate of 2 stirs per second using a palette knife of blade dimensions (32 mm×205 mm). The mixture was stirred for 30 seconds, and left to stand for a further 90 seconds. The product was then stirred for a further 30 seconds, at which time an adhesive composition in the form of smooth paste was obtained, with the following properties:

Adhesive composition

Viscosity—4560 mPaS pH—6.5

Solids content—4.2

We claim:

1. A wallcovering adhesive kit comprising a first and a second pack, the first pack containing a first composition comprising a water-continuous polymer emulsion selected from the group consisting of a vinyl acetate copolymer or homopolymer emulsion; a terpolymer of vinyl acetate, acrylic ester and the vinyl ester of a long chain branched organic acid; and a copolymer of vinyl acetate and butyl acrylate, and the second pack containing a second composition comprising a non-alkali activated, inverse emulsion of a water soluble, synthetic polymer having a high molecular weight and selected from the group consisting of an aqueous solution of a copolymer of ethylenically unsaturated monomers dispersed in isoparaffin hydrocarbon and an acrylamide copolymer dispersion in a solvent refined mineral oil, wherein the first composition, second composition, and optionally additional water are mixable by hand to form a wallcovering adhesive paste.

2. A wallcovering adhesive kit as claimed in claim 1 which is in concentrated form such that before use either the first pack or the second pack is added to water or both packs are added to water.

3. A wallcovering adhesive kit as claimed in claim 1 wherein the first composition or the second composition further comprises one or more components selected from the group consisting of biocides, plasticisers, starch, celluloses and surfactants.

4. A method of making a wallcovering adhesive paste composition comprising mixing, at a hand mixing rate a water-continuous polymer emulsion and a non-alkali activated inverse emulsion of a water soluble synthetic polymer having a high molecular weight until a thick paste is formed, wherein said water-continuous polymer emulsion is selected from the group consisting of a vinyl acetate copolymer or homopolymer emulsion; a terpolymer of vinyl acetate, acrylic ester and the vinyl ester of a long chain branched organic acid; and a copolymer of vinyl acetate and butyl acrylate, and said non-alkali activated inverse emulsion is selected from the group consisting of an aqueous solution of a copolymer of ethylenically unsaturated monomers dispersed in isoparaffin hydrocarbon and an acrylamide copolymer dispersion in a solvent refined mineral oil.

5. A method as claimed in claim 4 wherein the water-continuous polymer emulsion and the non-alkali activated inverse emulsion are added simultaneously to water with mixing.

6. A method as claimed in claim 4 wherein the water-continuous polymer emulsion is first mixed with water before mixing with the non-alkali activated inverse emulsion.

* * * * *